United States Patent [19]

Wiseman et al.

[11] Patent Number: 4,856,459

[45] Date of Patent: Aug. 15, 1989

[54] HEATER AND THERMOSTAT ARRANGEMENT FOR ANIMAL WATERERS

[75] Inventors: Leland G. Wiseman, Conrad; Daryl J. Hertema, Beaman, both of Iowa

[73] Assignee: Ritchie Industries, Inc., Conrad, Iowa

[21] Appl. No.: 81,285

[22] Filed: Aug. 3, 1987

[51] Int. Cl.4 .............................................. A01K 7/00
[52] U.S. Cl. ..................................................... 119/73
[58] Field of Search ............................. 119/73, 74, 78; 219/311, 463, 467

[56] References Cited

U.S. PATENT DOCUMENTS

| | | | |
|---|---|---|---|
| 1,590,286 | 6/1926 | Davis | 219/311 X |
| 4,333,626 | 6/1982 | Holbrook | 219/311 X |
| 4,646,687 | 3/1987 | Peterson et al. | 119/73 |

*Primary Examiner*—Robert Peshock
*Assistant Examiner*—R. Thomas Price
*Attorney, Agent, or Firm*—Todd S. Parkhurst

[57] ABSTRACT

An animal trough waterer and novel trough heater and thermostat arrangement are disclosed. The waterer includes a trough surrounded by an insulated housing. Attached to the bottom wall of the trough is a bracket which holds the heater in place against the trough. The bracket provides a slideway in which the thermostat is carried in any one of a range of positions. By adjusting the location of the thermostat to the heater, the water can be maintained at a relatively low but even temperature, and heater energy consumption can be reduced.

7 Claims, 2 Drawing Sheets

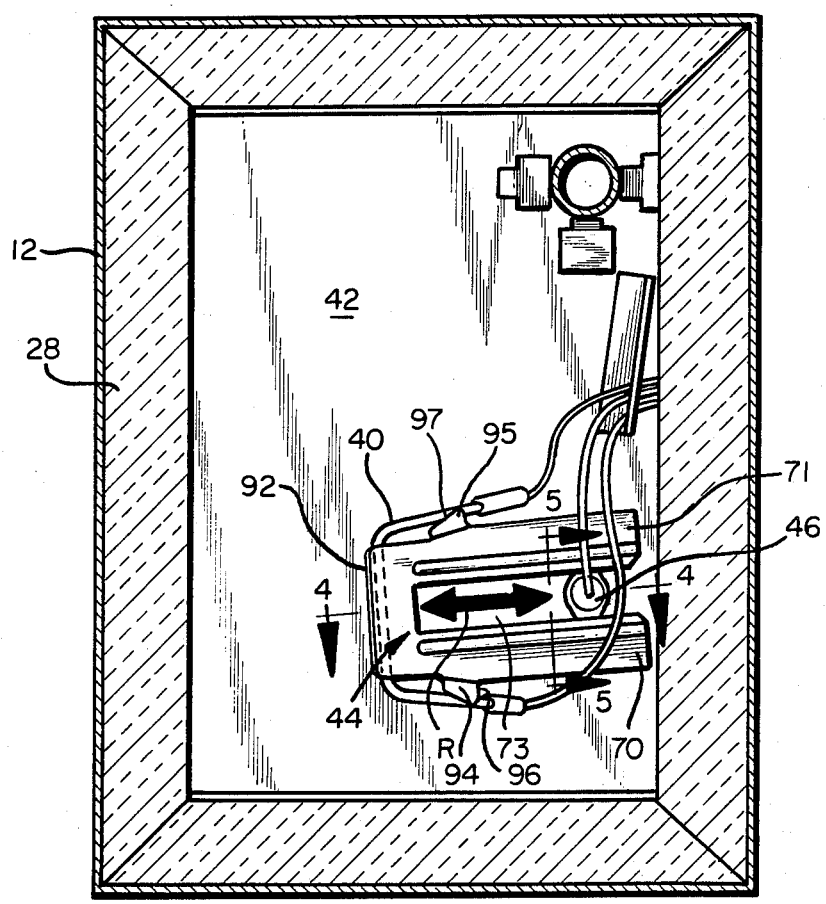
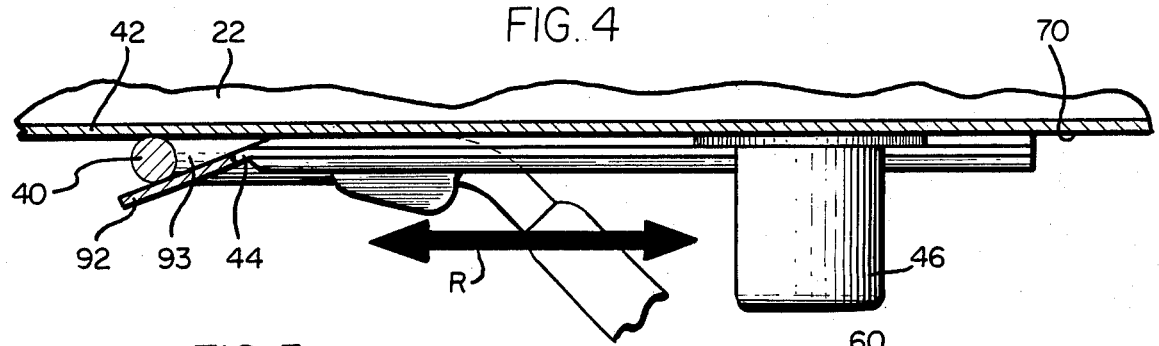
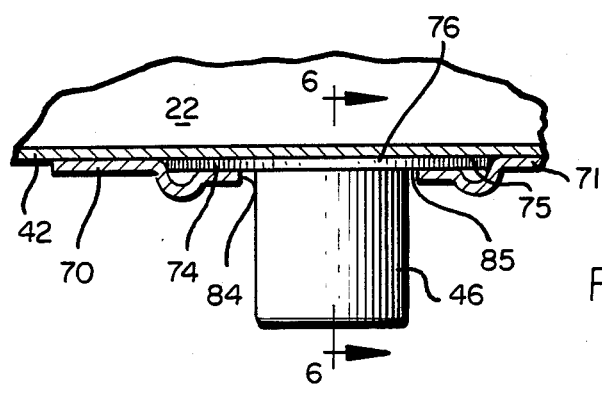
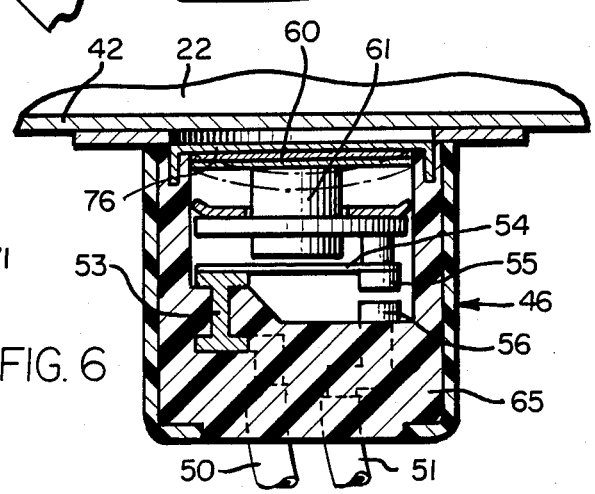

HEATER AND THERMOSTAT ARRANGEMENT FOR ANIMAL WATERERS

BACKGROUND OF THE INVENTION

This invention relates generally to livestock care equipment, and more particularly to heater and thermostat arrangements for maintaining water in water-supply equipment at a pre-selected temperature.

Proper care of cattle or like farm animals requires that the farmer or animal husbandman provide a supply of clean water to the animals on a continuous and year-round basis. When animals are maintained in a pasture or feedlot, the farmer often finds it advantageous to provide water sources at specific locations, and to provide that water in specially designed watering devices.

One such device which has met with considerable commercial success is a well-type waterer described and claimed in U.S. Pat. No. 4,646,687. This watering device is insulated and covered so as to inhibit the contained water from freezing even during the protracted cold spells experienced in the Upper Midwest of the United States and elsewhere. A heater and thermostat arrangement can be provided in the waterer housing to maintain the water in an unfrozen and palatable state.

Modern agricultural animal husbandry is a highly complex commercial enterprise. Downward economic pressure on the price of livestock and livestock products such as milk, coupled with rising costs, require that the animal husbandman or farmer operate on increasingly thin margins of profit. Accordingly, the initial costs—and the operating costs—of any animal care equipment are of increasing importance to the farmer who is purchasing equipment, and to the manufacturer who is designing and making the equipment. To minimize the manufacturing cost of any waterer unit, the equipment manufacturer often utilizes electric resistance heaters of the caloric rod types. When intermittent heater operations can be used to maintain the water at a pre-selected temperature, inexpensive thermostats are often connected in electric series with these heaters.

One popular form of thermostat is that offered by the Essex Group of United Technologies, Inc. of Lexington, Ohio, as Type 414. This thermostat, and other inexpensive thermostats like it, is of the make-or-break variety. That is, electric contacts contained within the thermostat unit are closed by cooler temperatures so as to permit current to flow through the thermostat to the electric heater. When the water-containing trough or other thermally-sensed object warms up to a pre-selected temperature, the thermostat electric contacts separate, thereby breaking the circuit and halting electric current delivery to the heater. This contact make-or-break action is provided by mounting one of the contacts for cooperation with a bimetallic strip; temperature changes in the bimetallic strip cause contact movement between a contact and circuit open position and a contact and circuit closed position.

While these thermostats are inexpensive to manufacture, they are not always commercially available with close temperature tolerances. That is, the temperature required to move the contacts from a closed position to an open position may vary by as much as 15 degrees Fahrenheit between thermostat units made by the same manufacturer. Similar temperature variation may be present in the temperatures required to move the contacts from the open to the closed position.

It is, of course, necessary to maintain water in a watering trough in an ice-free unfrozen condition. This means that the heater and thermostat must operate to maintain the water at or above 32 degrees Fahrenheit at all times. When thermostats of the type described here are used, long heater cycle times are normally experienced. That is, when the thermostat contacts close and water heating action begins, heating continues for a relatively long period of time and the water is warmed to a relatively elevated temperature before the thermostat opens so as to halt heating action. Trough water temperatures of 60 degrees Fahrenheit have been encountered.

In the winter, water being delivered to a trough from a near-by well usually arrives at a temperature considerably below 60 degrees. This means that all incoming water must be heated by electricity supplied to the watering device in order to ensure against ice formation in the water trough. These long duty cycles and extensive water heating lead to increased operational cost for the animal husbandman.

But unless extended heating is provided, the long period of time during which the heater is turned off might permit the temperature within the incoming well water pipe to drop below freezing, thereby permitting the water in that line to freeze. Such freezing action could destroy the waterer and a frozen waterer can lead to livestock loss.

It is accordingly an object of the present invention to provide a thermostat and heater arrangement which will permit the heater to be operated in short duty cycles. That is, the heater can be turned on and off relatively rapidly, and the adjacent water can thereby be maintained at a relatively uniform temperature without wide temperature swings in the water. With these arrangements, the average water temperature can be reduced, and electric energy savings can be effected.

Another object is to provide a heater and thermostat arrangement especially designed for a trough-type waterer which is inexpensive yet effective, reliable and rugged. Yet another object is to provide an inexpensive yet effective, reliable and rugged system for mounting a heater and a thermostat to a water trough. A related object is to provide a mounting system which will permit the heater and thermostat to work effectively together so as to save energy.

Other objects and advantages of the invention will become apparent upon reading the following detailed description and upon reference to the drawings. Throughout the drawings, like reference numerals refer to like parts.

SUMMARY OF THE INVENTION

To accomplish the objectives, the invention comprises a trough waterer having a heater and a thermostat mounted to a wall of the trough. A bracket holds the heater in a fixed location adjacent the trough wall, and mounts the thermostat adjacent the wall in any one of a range of positions varying in distance from the heater.

BRIEF DESCRIPTION OF THE DRAWINGS

FIG. 3 is a sectional view taken substantially in the plane of line 2—2 in FIG. 1;

FIG. 3 is a sectional view taken substantially in the plane of line 3—3 in FIG. 2;

FIG. 4 is a fragmentary sectional view taken substantially in the plane of line 4—4 in FIG. 3;

FIG. 5 is a fragmentary sectional view taken substantially in the plane of line 5—5 in FIG. 3; and FIG. 6 is a fragmentary sectional view taken substantially in the plane of line 6—6 in FIG. 5.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

DETAILED DESCRIPTION

Figure 1:
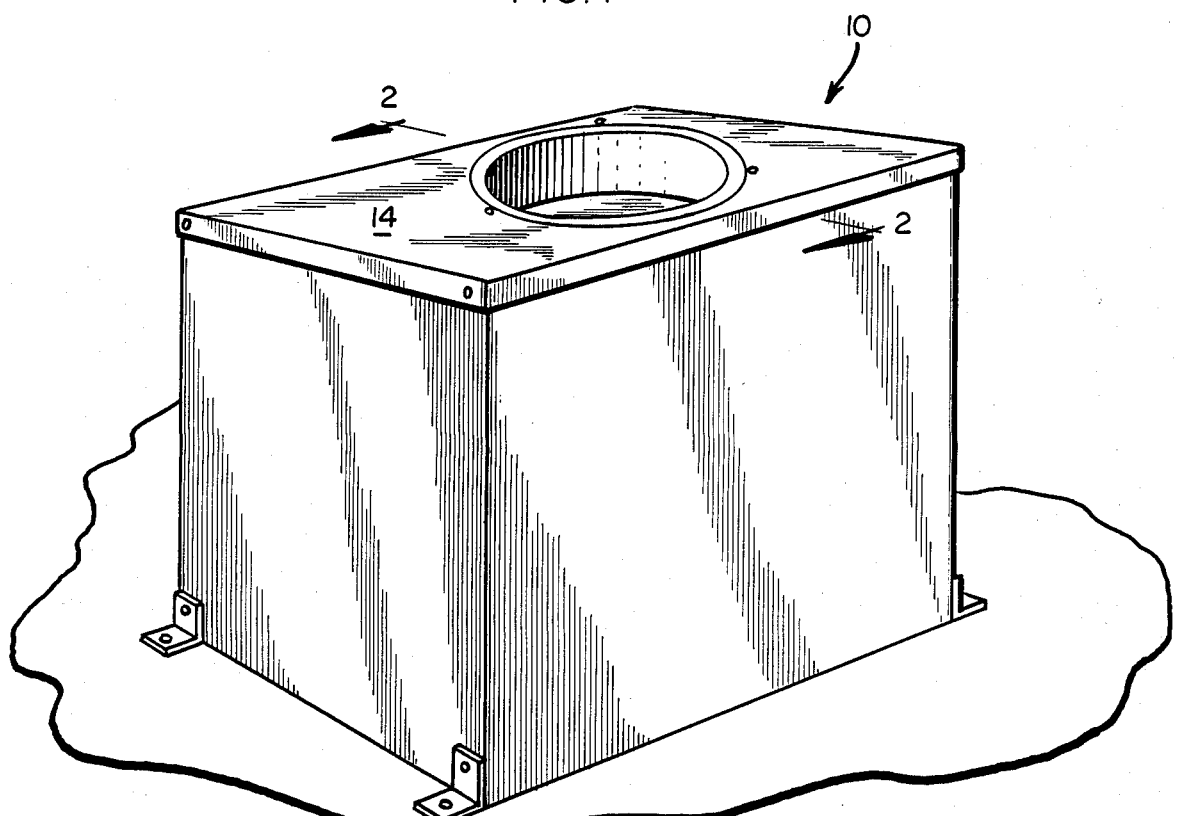
FIG. 1 is a perspective view of a trough-type livestock waterer employing the present invention.
Figure 2:
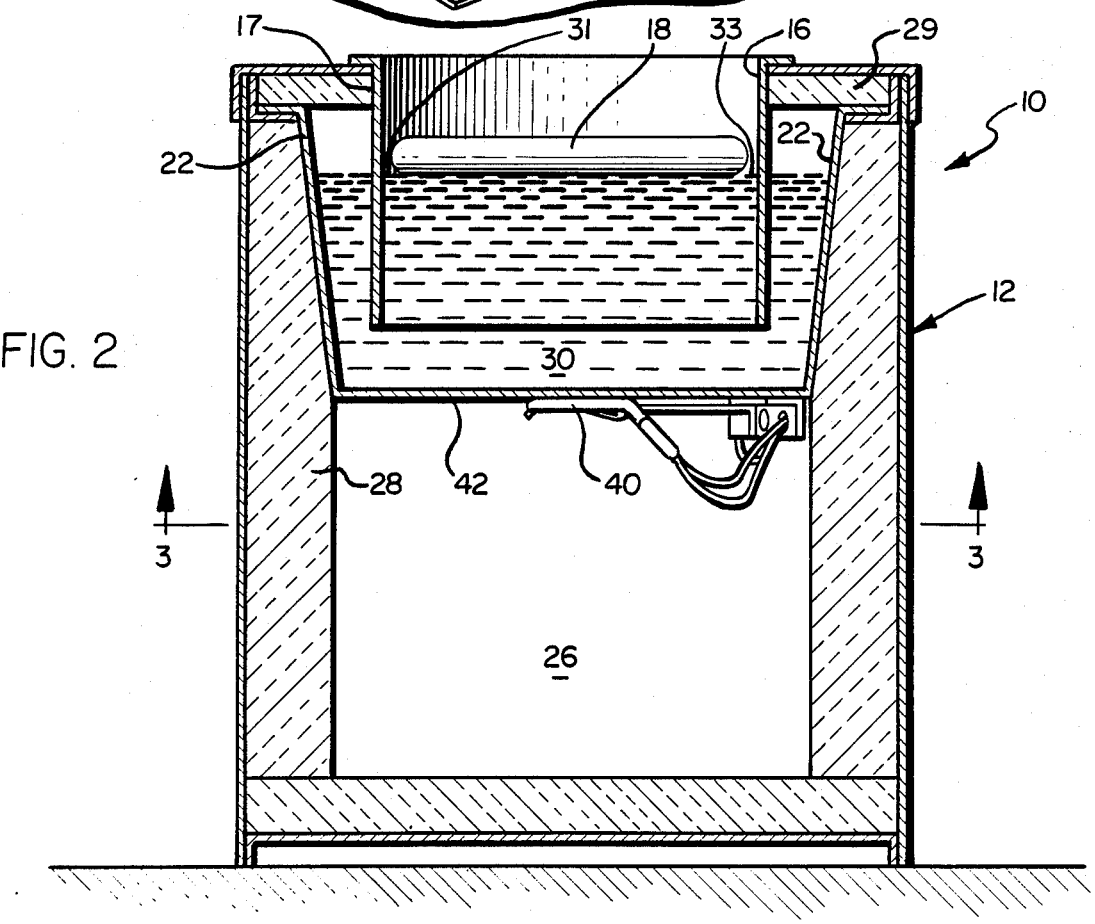
FIG. 2 is a sectional view taken substantially in the plane of line 2—2 in FIG. 1.

Turning first to FIGS. 1, 2 and 3, there is shown an animal waterer 10 in which is embodied the present invention. Generally, the waterer 10 comprises a container 12, a top cover 14, and a drink tube 16 extending downwardly through a mating aperture 17 formed in the top cover 14. A drink float 18 is disposed within the tube 16. A trough 22 is supported in the upper portion of the housing 12, and a lower chamber 26 is defined by the housing 20 below the trough 22. The top cover 14 and housing 20 can be constructed from durable, workable material such as galvanized sheet steel or similar material which can withstand the abuse of both weather and farm animals. The top cover 14 is designed to positively engage the housing 20 all around the waterer periphery in order to stay firmly in place on the housing even under high winds or animal abuse.

Insulation 28 can line the interior of the housing 20. In the embodiment shown here, this insulation 28 takes the form of styrofoam low-density plastic, and it can be several inches thick. Similar insulation 29 can be provided adjacent the top cover 14.

The drink tube 16 can be constructed of galvanized sheet steel or a hard plastic, and it can be formed either as a part of the cover 14, or as a separate unit. This drink tube projects downwardly through the top cover 14 into a mediate region of the water 30 in the trough 22.

In the preferred embodiment, the drink float 18 is a circular, flat disk formed of plastic or similar material; the disk floats upon the water surface 31. This float has unrestricted longitudinal movement within the drink tube 16, and some clearance in 33 is provided between the drink tube 16 and the drink float 18.

An animal seeking a drink will learn to place its mouth within the drink tube 16 and push down on the drink float 18. Because the drink float 18 is constrained within the drink tube 16, the force or pressure applied downwardly to a portion of the drink float 18 will cause that portion of the float to submerge below the water surface 31, thus exposing a quantity of water 30 to the animal. After taking as much water as animal desires, the animal lifts its head from the drink tube 16, and thus removes the downward pressure on the drink float 18. The submerged portion of the drink float 18 then bobs to the surface of the water 31 within the drink tube 16.

This drink float 18 substantially reduces the amount of exposed water surface 31, and thereby greatly reduces the heat lost by the water surface 31 to the atmosphere. However, during conditions of prolonged cold weather, heat will nevertheless be lost to the atmosphere and, without a positive heat source, that water 30 might eventually freeze.

In accordance with the invention, water freeze-up is discouraged with minimal energy utilization. To this end, and as shown in FIGS. 3-6, an electrical resistance of the caloric rod type 40 is mounted to the bottom 42 of the trough 22 by a bracket 44. The heater 40 provides heat through the bottom 42 to the water 30 in the trough. A thermostat 46 is also mounted to contact the trough bottom 42 by means of the bracket 44. The thermostat in 46 is electrically connected to the heater 40 for controlling the amount of heat supplied by the heater 40 to the water.

This thermostat 46 is of the inexpensive make-or-break variety. Here, wires 50, 51 lead to the thermostat unit 46. As can be envisioned from FIG. 6, current entering the unit 46 from the wire 50 flows through an electrically conductive mount 53 and a cantilever strip 54 to a contact 55. This contact 55 is mounted in a position opposed to another contact 56 which is electrically connected to the opposite wire 51.

A bimetallic strip 60 is mounted in the base of the thermostat 46, and is here located in a position adjacent the trough bottom 42. As the temperature in the water and trough 22 cools and the bottom 42 is consequently cooled, the bimetallic strip 60 is also cooled. This cooling action causes the bimetallic strip 60 to change its shape from that shown in solid lines in FIG. 6 to that shown in phantom lines. Under these circumstances, the contact plug 61 engages the cantilever strip 54 and forces the contact 55 downwardly into electrical and mechanical engagement with the opposite contact 56. When the thermostat 46 is so configured, current flows to the heater 40.

When, however, the water temperature in the trough 22 rises, the bimetallic strip 60 snaps from the relatively bowed position shown in phantom lines in FIG. 6 to the relatively straight position shown in solid lines. Under these circumstances, the plug 61 mounted on the bimetallic strip 60 moves upwardly and out of engagement with the cantilevered strip 54. This permits the contacts 55 and 56 to spring apart, thereby halting current flow through the wires 50 and 51. A potting compound 65 can be provided to maintain the thermostat parts in their proper operating locations. It will be understood that, due to slight variances in the make-up of the bimetallic strip 60 and other variances encountered in manufacturing, the exact temperature at which the bimetallic strip operates to move the contacts 55 and 56 between the open and closed position will vary from thermostat unit to thermostat unit.

In accordance with the invention, provision is made for accurate control of water temperature at relatively cool levels even by thermostats which may vary from unit to unit in their operating temperature characteristics. To this end, the bracket 44 mounted to the outer side 70 of the trough bottom 42 is provided with two opposed legs 70, 71 defining an elongated slideway adapted to receive the thermostat 46, and mount the thermostat 46 in any one of a range of positions, as suggested by the arrow R in FIGS. 3 and 4. These positions vary in distance from the heater 40, as can be envisioned.

As especially shown in FIG. 5, the thermostat 46 is provided with ears 74, 75 extending in opposite directions from the thermostat base 76. The leg brackets 70, 71 are formed so as to provide, together with the trough bottom 42, opposed ear slots 84, 85 adapted to receive the thermostat ears 74 and 75. The bracket legs 70, 71 act to clamp the ears 74, 75 and thermostat 46 against the trough bottom wall 42 in a heat-receiving and sensing position.

In use, the animal husbandman or equipment installer simply slides or moves the thermostat 46 towards or away from the heater 40 along the slideway 73. As can be envisioned, the closer the thermostat 46 is to the heater 40, the more heat the thermostat 46 will quickly receive from the heater 40 and the warming trough bottom 42. A relatively slow-acting thermostat, or one which operates at a relatively high temperature, can be mounted close to the heater 40. Conversely, a relatively fast-acting thermostat, or one which operates at a low temperature, can be mounted toward the opposite end of the slot and relatively far away from the heater 40. Some small amount of adjustment will quickly provide the desired trough water temperature.

In carrying out another aspect of the invention, the bracket 44 also operates to mount or clamp the heater 40 directly against the trough bottom 42 in a heat-trasmitting position. To this end, the bracket 44 includes a head tab 92 which defines, together with the trough bottom wall 42, a head tab heater slot 93 adapted to receive the heater element 40 and press that heater element 40 into contact with the wall 42. Opposed side tabs 94, 95 extend from respective bracket legs 70, 71. Each side tab 94, 95 defines, together with the underlying trough bottom wall 42, side tab slots 96 and 97 adapted to receive the heater 40 and additionally press the heater 40 into heat-transmissive contact with the trough bottom 42. These three tabs 92, 94 and 95 thus cooperate to mount the heater 40 in an immovable position in heat-transmissive contact with the outer side 70 of the trough bottom 42.

We claim:

1. A livestock waterer, comprising, in combination, a trough for holding water, the trough being at least partly defined by a heat-conductive wall, the wall having an inner side for containing the water and an opposite outer side, an electric heater adjacent to the wall outer side for providing heat through the wall to the water, a thermostat having electric contacts electrically connected to the heater for controlling the electric power supplied to the heater and consequently controlling the amount of heat supplied by the heater to the water, the thermostat further including a bimetallic strip element in thermal contact with and adjacent the trough wall so as to change its shape in response to the wall temperature, and plug means interposed between the bimetallic strip element and an electric contact so as to cause the contacts to move into and out of electrically conductive contact with each other in response to the temperature of the wall and bimetallic strip, the waterer further including a bracket mounted to the wall outer side and engaging the thermostat so as to locate the thermostat bimetallic strip element adjacent to the wall outer side at any one of a range of positions varying in distance from the heater.

2. A waterer according to claim 1 wherein said bracket includes heater mounting means for mounting said heater in an immovable position against and in contact with the wall outer side.

3. A waterer according to claim 1 wherein said bracket includes opposed legs defining an elongated slideway adapted to receive said thermostat and mount said thermostat in said position.

4. A waterer according to claim 3 wherein said thermostat further includes a housing having opposed ears, and wherein each of said bracket legs define, together with said wall, an ear slot adapted to receive one of said thermostat housing ears extending from said thermostat, the wall and bracket legs acting to clamp the ears thermostat housing and thermostat bi-metallic strip element in contact with the wall.

5. A waterer according to claim 3 wherein said bracket includes a side tab means extending from each said leg, each side tab defining, together with said wall, a side tab slot adapted to receive a heating element and press the heating element into contact against the wall.

6. A waterer according to claim 2 wherein said heater mounting means includes a head tab means defining, together with said wall, a head tab heater slot adapted to receive a heating element and press the heating element into contact against the wall.

7. A device for mounting a heater and a thermostat to a thermally conductive wall, the device comprising a bracket having a first set of ears for cooperation with the wall to secure the heater in a given position against the wall, and having a second set of ears to form, in cooperation with the wall, a continuous slideway to secure the thermostat against the wall in any one of a range of positions varying in distance from the given heater position.

* * * * *